United States Patent
Court et al.

(10) Patent No.: US 8,973,567 B2
(45) Date of Patent: Mar. 10, 2015

(54) ADAPTING OF AN OXY-COMBUSTION PLANT TO ENERGY AVAILABILITY AND TO THE AMOUNT OF $CO_2$ TO BE TRAPPED

(75) Inventors: Philippe Court, Vincennes (FR); Arthur Darde, Paris (FR); Jean-Pierre Tranier, L'Hay-les-Roses (FR); Patrick Le Bot, Vincennes (FR); Jean-Marc Tsevery, Lieusaint (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1143 days.

(21) Appl. No.: 12/743,953

(22) PCT Filed: Nov. 25, 2008

(86) PCT No.: PCT/FR2008/052121
§ 371 (c)(1),
(2), (4) Date: May 20, 2010

(87) PCT Pub. No.: WO2009/071833
PCT Pub. Date: Jun. 11, 2009

(65) Prior Publication Data
US 2010/0242811 A1    Sep. 30, 2010

(30) Foreign Application Priority Data
Nov. 26, 2007    (FR) .................. 07 59319

(51) Int. Cl.
| F23J 15/00 | (2006.01) |
| F23L 7/00 | (2006.01) |
| F23J 15/06 | (2006.01) |
| F25J 3/04 | (2006.01) |

(52) U.S. Cl.
CPC .............. *F23L 7/007* (2013.01); *F23J 15/06* (2013.01); *F25J 3/04509* (2013.01);
(Continued)

(58) Field of Classification Search
CPC .............. F23J 15/00; F23J 15/02; F23L 9/00; F23D 1/00; F23D 14/60; F23D 14/66
USPC ......................... 126/2; 431/3; 110/203, 347
See application file for complete search history.

(56) References Cited

U.S. PATENT DOCUMENTS

| 6,568,185 B1 | 5/2003 | Marin et al. |
| 7,228,715 B2 * | 6/2007 | Brugerolle et al. ............. 62/643 |

(Continued)

FOREIGN PATENT DOCUMENTS

| DE | 4436904 | 4/1996 |
| DE | 102005012902 | 9/2006 |
| EP | 1338848 | 8/2003 |
| FR | 2891609 | 11/2007 |
| WO | 02084177 | 10/2002 |

OTHER PUBLICATIONS

Andersson K. et al., "Large Scale CO2 Capture—Applying the Concept of 02/CO2 Combustion to Commercial Process Data// Grosstechnische CO2-Abscheidung-Uebertragung Des Konzepts Der 02/CO2-Verbrennung Auf Industrielle Prozessdaten", VGB Powertech, Essen, DE. vol. 83, No. 10, Jan. 1, 2003, pp. 29-33, XP001185004, ISSN: 1435-3199, Fig. 1.
PCT Search Report for PCT/FR2008/052121.

*Primary Examiner* — Avinash Savani
(74) *Attorney, Agent, or Firm* — Justin K. Murray; Elwood L. Haynes

(57) ABSTRACT

A carbon fuel combustion process, employing an air gas separation unit, a combustion unit operating either with air or with an oxidizer leaner in nitrogen than air, coming from the air gas separation unit, and a unit for compressing and/or purifying the $CO_2$ coming from the combustion flue gas, wherein the power consumed by the air gas separation unit and/or the flow of oxygen produced by the air gas separation unit and/or the capture of the $CO_2$ coming from the combustion flue gas are variable over time is presented.

28 Claims, 6 Drawing Sheets

(52) U.S. Cl.
CPC ......... *F25J 3/04515* (2013.01); *F25J 3/04533* (2013.01); *B01D 2257/504* (2013.01); *F23J 2215/50* (2013.01); *F23J 2900/15061* (2013.01); *F23L 2900/07001* (2013.01); *Y02E 20/322* (2013.01); *Y02E 20/344* (2013.01); *Y02E 20/363* (2013.01)
USPC .................... 126/2; 431/3; 110/203; 110/347

(56) References Cited

U.S. PATENT DOCUMENTS

| 2006/0096298 | A1* | 5/2006 | Barnicki et al. | ................ | 60/781 |
| 2007/0144415 | A1* | 6/2007 | Varagani et al. | .............. | 110/347 |
| 2009/0031696 | A1 | 2/2009 | Dengel et al. | | |
| 2009/0075219 | A1 | 3/2009 | Vilagines et al. | | |

* cited by examiner

ADAPTING OF AN OXY-COMBUSTION PLANT TO ENERGY AVAILABILITY AND TO THE AMOUNT OF $CO_2$ TO BE TRAPPED

This application is a §371 of International PCT Application PCT/FR2008/052121, filed Nov. 25, 2008.

FIELD OF THE INVENTION

The present invention relates to a carbon fuel combustion process, employing an air gas separation unit, a combustion unit operating either with air or with an oxidizer leaner in nitrogen than air, coming from the air gas separation unit, and a unit for compressing and/or purifying the $CO_2$ coming from the combustion flue gas, characterized in that the power consumed by the air gas separation unit and/or the flow of oxygen produced by the air gas separation unit and/or the capture of the $CO_2$ coming from the combustion flue gas are variable over time.

BACKGROUND

Climate change is one of the greatest environmental challenges. The increasing concentration of carbon dioxide in the atmosphere is to a very large part due to global warming. The $CO_2$ from human activity is essentially discharged into the atmosphere through the combustion of fossil fuels in power stations.

To combat $CO_2$ emissions, one technology is aimed at capturing the $CO_2$ emitted during the combustion of carbon fuels in order to sequester it underground. One of the constraints posed is how to separate the $CO_2$ from the flue gas in which its fraction conventionally does not exceed 15%, but which entails substantial energy to carry out the separation.

One option consists in separating the nitrogen from the air upstream of the combustion, almost only $CO_2$, water and combustion products then remaining at the outlet of the boiler. The boiler therefore operates in oxyfuel combustion mode. A portion of the flue gas (essentially $CO_2$) may be recycled with oxygen in order to prevent excessively high temperatures being reached in the boiler. $CO_2$ capture is therefore provided at lower cost.

This technique is promising, both from the investment standpoint and the overall energy efficiency.

As long as infrastructures for channeling and sequestering the $CO_2$ are not close enough, or as long as the price per ton of $CO_2$ sold is not high enough, it cannot be economically profitable to capture all the $CO_2$ emitted by a power station.

One solution would be to employ partial $CO_2$ capture. However, partial $CO_2$ is not well suited to oxyfuel combustion technology. In effect, it is necessary to operate in 100% oxyfuel combustion mode or 100% in air mode, but it is difficult to move away from these regimes. This is because if there is more than 30% nitrogen in the flue gas, $CO_2$ separation loses all the advantages that are obtained when the flow is more concentrated.

Thus, the reference solution for partial capture would be to invest 100% in an ASU (air separation unit) and to operate this at 100% of its capacity. However, it is possible to invest only partly in a compression/drying unit (or invest 100% in it but to operate it only with a level of $CO_2$ that it is desired to capture). Unfortunately, this compression/drying unit only represents a small part of the investment and energy consumed thereby, unlike an ASU.

Moreover, operating with an ASU at 100% of its capacity means consuming an amount of energy which is constant over time. This precludes adapting the operation to the variations in available energy cost and flow.

From this starting point, one problem that arises is how to provide a combustion process suitable for partial $CO_2$ capture and for variable energy supply.

SUMMARY OF THE INVENTION

One solution provided by the invention is a carbon fuel combustion process, employing an air gas production unit, a combustion unit operating either with air or with an oxidizer leaner in nitrogen than air, at least partly coming from the air gas separation unit, and a unit for compressing and/or purifying the $CO_2$ coming from the combustion flue gas, characterized in that, over a finite period T:
  the power drawn by the air gas production unit is variable; and/or
  the capture of the $CO_2$ coming from the combustion flue gas, via the $CO_2$ compression and/or purification unit, is intermittent.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The expression "air gas production unit" is understood to mean a unit comprising the air gas separation unit, the various cryogenic storage tanks and the pipework necessary for its operation.

Depending on the case, the process according to the invention may have one or more of the following features:
  the flow of oxygen produced by the air gas production unit is variable,
  the carbon fuel consumption by the combustion unit is constant over the period T, whereas the power delivered by said combustion process is variable over the period T;
  the combustion unit operates alternately with air and with the oxidizer leaner in nitrogen than air;
  the $CO_2$ compression and/or purification unit has, over the period T, at least one stop phase and at least one operating phase;
  the air gas production unit draws power that can vary over at least one portion of the period T but produces a constant oxygen flow during this same portion of the period T;
  the air gas production unit switches to oxygen production phase when an oxidizer leaner in nitrogen than air is employed in the combustion unit;
  the oxygen coming from the air gas separation unit is entirely or partly stored in the form of a cryogenic liquid;
  the stored oxygen serves as a reserve for a device external to the combustion process units;
  at least one portion of the cryogenic liquid less rich in oxygen coming from the air gas production unit is stored on leaving the air gas separation unit when oxygen is consumed in the combustion unit;} the cryogenic liquid less rich in oxygen stored on leaving the air gas separation unit is consumed within the air gas separation unit when oxygen is liquefied by this same air gas separation unit;

at least one portion of the combustion flue gas is mixed with the oxygen produced by the air gas production unit before being introduced into the combustion unit when the latter is operating with the oxidizer leaner in nitrogen than air;

the air gas production unit has, over the period T, at least one stop phase or reduced-output phase and at least one operating phase with a higher output than the reduced output, and in that the time required for switching from a stop phase or reduced-output phase to an operating phase with a higher output is less than one hour, preferably less than 30 minutes and more preferably less than 15 minutes;

the time required to switch from a stop phase or reduced-output phase to an operating phase with a higher output is shortened by cryogenic liquid being injected into and/or withdrawn from the air gas separation unit;

the oxygen produced by the air gas separation unit is at least partly stored when the energy necessary for oxygen production is available at a lower cost than the average;

the stored oxygen is consumed by the air gas separation unit when the energy necessary for oxygen production is available at a higher cost than the average;

the $CO_2$ coming from the $CO_2$ compression and/or purification unit is at least partly stored so as to smooth out the amount of $CO_2$ produced;

the $CO_2$ compression and/or purification phases coincide with phases in which the energy necessary for this $CO_2$ compression and/or purification is available at a lower cost than the average;

the air gas production unit, the combustion unit and the $CO_2$ compression and/or purification unit are automatically controlled so as to adapt to the variation in energy costs necessary for operating these units;

the $CO_2$ compression and/or purification unit employs a compressor and/or a drying unit, preferably a cryogenic unit;

the drying unit consists of a single bottle filled with adsorbents according to a pressure cycle comprising an adsorption phase coinciding with the operation of the combustion unit with an oxidizer leaner in nitrogen than air and a regeneration phase coinciding with the operation of the combustion unit with air; and the $CO_2$ coming from the $CO_2$ compression and/or purification unit is bottled or it feeds a $CO_2$ line for an industrial usage or an underground storage tank.

The expression "variable power or flow" is understood to mean that the power or flow can change over the course of the period T.

Moreover, the subject of the invention is also a carbon fuel combustion installation comprising an air gas production unit, a combustion unit operating either with air or with an oxidizer leaner in nitrogen than air, coming from the air gas separation unit, and a unit for compressing and/or purifying the $CO_2$ coming from the combustion flue gas, characterized in that the operation of these three units is controlled by a computer so that, over a finite period T:

the power drawn by the air gas production unit is variable; and/or the capture of the $CO_2$ coming from the combustion flue gas, via the $CO_2$ compression and/or purification unit, is intermittent.

Preferably the installation according to the invention includes a $CO_2$ recirculation line connecting the outlet of the combustion unit to the inlet of the combustion unit.

The recirculation line serves, on the one hand, to return at least a portion of the combustion flue gas to the combustion unit and, on the other hand, to mix within this line the oxygen produced by the air separation unit. The combustion flue gas thus returned acts as thermal ballast in the combustion unit. This is because with only oxygen as oxidizer, temperatures above 2000° C. would be obtained in the combustion unit. The combustion flue gas thus returned makes it possible for the temperature to come down to the temperature for which the combustion unit is designed, that is to say preferably a temperature below 1200° C.

The term "combustion unit" is understood to mean a boiler or an incinerator, preferably a circulating fluidized bed boiler or a pulverized coal boiler.

The term "circulating fluidized bed boiler" is understood to mean a boiler in which the fuel is burnt in suspension in air.

The term "pulverized coal boiler" is understood to mean a boiler in which the fuel is finely ground.

The term "period T" is understood to mean a period between 1 hour and one year. If the period T is of the order of 1 hour, day or week, the air gas separation unit operates continuously and enables oxygen to be stored when it is not directly consumed in the boiler. If the alternative operating period is longer (a month or season), the air gas separation unit has to be turned on and off.

The term "alternative operation" is understood to mean that various divisions of the period T may be envisioned. In the case of the period being divided into a phase in which the combustion unit operates with air and a phase in which this same combustion unit operates with the oxidizer leaner in nitrogen than air, each of these phases may occupy between 20 and 80%, preferably between 30 and 70% and more preferably 50% of the time over the period T. In the case of the period being divided into n phases in which the combustion unit operates with air and n phases in which it operates with the oxidizer leaner in nitrogen than air, each of these phases may occupy between 20/n and 80/n %, preferably between 30/n and 70/n % and more preferably 50/n % of the period T. However, whatever the division, an operating phase with air is always followed by an operating phase with an oxidizer leaner in nitrogen than air, and vice versa.

The term "carbon fuel" is understood to mean for example coal, lignite, household waste or any biomass fuel (plant debris, plant production dedicated to combustion, etc.).

The expression "oxidizer leaner in nitrogen than air" is understood to mean oxygen and $O_2/CO_2$ mixtures.

The energy necessary for operating the various units employed in the combustion process comes either from the electric power production unit itself, supplied by the oxygen produced, or from another electric power production unit via an electricity transport network, or by a direct electricity supply from a renewable source (solar panels, wind turbines, hydroelectric dam, etc.).

Figure 1:
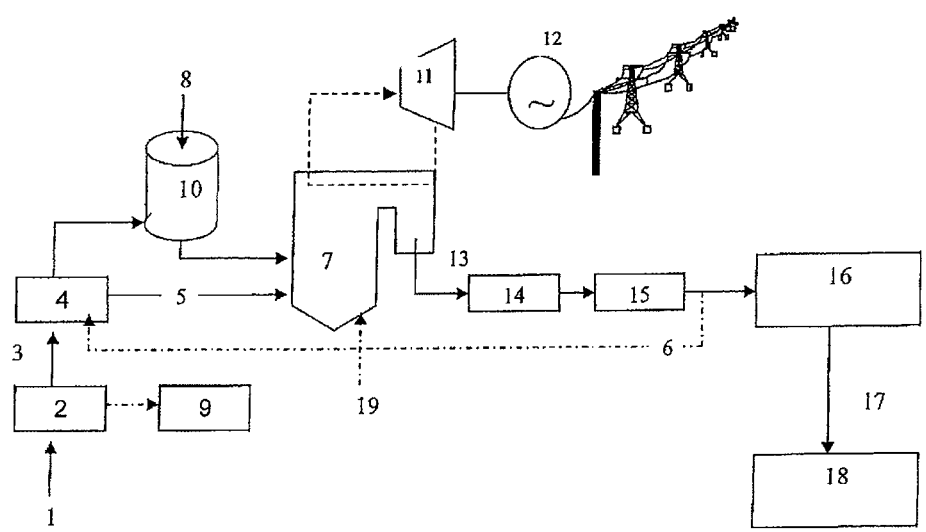
FIG. 1 illustrates a general diagram, according to the invention, employing, for partial $CO_2$ capture, an air gas separation unit, a combustion unit, employing a pulverized coal boiler and operating alternately with air and with an oxidizer leaner in nitrogen than air, and a $CO_2$ compression and/or purification unit

FIG. 1 shows a general diagram, according to the invention, employing, for partial $CO_2$ capture, an air gas separation unit, a combustion unit, employing a pulverized coal boiler and operating alternately with air and with an oxidizer leaner in nitrogen than air, and a $CO_2$ compression and/or purification unit.

Air 1 is introduced into the air gas separation unit 2, which then produces a constant or variable flow of oxygen 3. The oxygen 3 is stored when the combustion unit 7 operates with air or, when the combustion unit 7 operates with the nitrogen-depleted oxidizer, is sent to a mixer 4 where it can be mixed via a $CO_2$ recirculation line with a $CO_2$-rich recycle gas 6. The oxidizer 5 coming from the mixer 4 is then introduced into the pulverized coal boiler 7 which is then operating with an oxidizer leaner in nitrogen than air.

The fuel 8, here the feed coal, is firstly sent to a pulverizer 10 before being introduced into the pulverized coal boiler 7.

The steam output by the boiler is expanded in a steam turbine 11, which delivers mechanical work. This work is converted into energy by means of an alternator 12.

The combustion flue gas 13 itself is dedusted at 14 and optionally desulfurized at 15 before being sent into the $CO_2$ compression/purification unit 16 (CPU).

The purified $CO_2$ 17 coming from the CPU unit 16 may then be bottled and/or transported and/or stored at 18.

In the case in which the boiler 7 is operating with air, the air 19 is introduced into the boiler 7 and the combustion flue gas 13 is dedusted at 14 and desulfurized at 15, but it is not sent to the CPU unit 16. The $CO_2$ is not captured.

Figure 2:
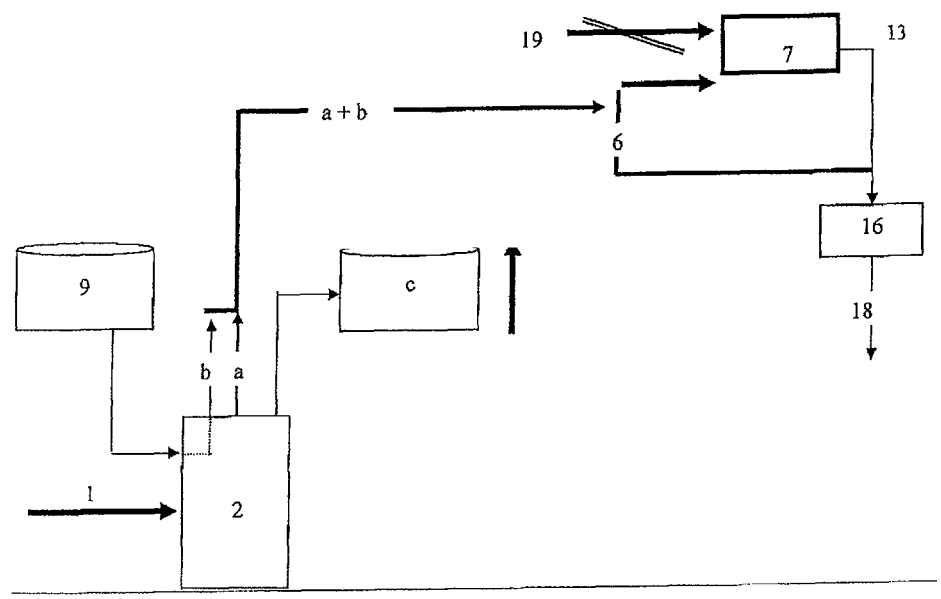
FIG. 2 shows a diagram explaining the operation in "oxy-fuel combustion" mode of the three main units employed in the combustion process according to the invention.

FIG. 2 shows a diagram explaining the operation in "oxyfuel combustion" mode of the three main units employed in the combustion process according to the invention. The three units are the air gas separation unit (ASU), the combustion unit and the $CO_2$ compression/purification unit (CPU). The term "oxyfuel combustion" mode is understood to mean a mode characterized by combustion with an oxidizer leaner in nitrogen than air and $CO_2$ capture.

In "oxyfuel combustion" mode, the following are introduced into the ASU 2:
  air 1; and
  the oxygen 9 stored in cryogenic liquid form during the last phase in "air" mode.

The ASU 2 then produces an amount of oxygen a+b corresponding to the "immediate" production a of oxygen to which the production b of oxygen stored during the last phase in "air" mode is added.

The ASU 2 also produces a cryogenic liquid c less rich in oxygen.

The a+b oxygen produced by the ASU 2 is then mixed, via a $CO_2$ recirculation line, with a $CO_2$-rich recycle gas 6 before being sent to the combustion unit, which is no longer fed with the air 19 in comparison to the "air" mode.

The $CO_2$-rich combustion flue gas 13 coming from the combustion unit 7 is then sent to the $CO_2$ compression/purification unit 16 for the purpose of being bottled and/or transported and/or stored at 18.

When the combustion unit is thus operating with an oxidizer leaner in nitrogen than air, that is to say operating with oxygen or an oxygen/carbon dioxide mixture, the oxygen introduced into the combustion unit is produced by a continuously operating air separation unit (ASU). Thus, the ASU must produce the nominal $O_2$ flow suitable for the operating phase of the combustion unit using the oxidizer leaner in nitrogen than air, while producing nothing during the rest of the time. The principle is to store the oxygen in liquid form while the combustion unit is operating with air and to consume it when the combustion unit is operating with an oxidizer leaner in nitrogen than air. Since the ASU continues to operate during consumption of the stored energy, the two production outputs are added. To avoid loss of liquefaction energy, a suitable amount of a gas less rich in oxygen, preferably nitrogen or air, is liquefied during oxygen consumption. When the oxygen is being liquefied, the ASU separates oxygen from the air, but the actual liquefaction is provided by the consumption within the ASU of the cryogenic liquid less rich in oxygen that had accumulated during the last oxygen consumption phase.

In this first case, the ASU thus operates continuously, in an optimum manner and in "gas mode". It has to supply only the energy to separate the air gases, and not that for the liquefaction, which is much greater. Finally, since the ASU produces only the oxygen necessary for combustion, the total energy consumed remains proportional to the amount of $CO_2$ stored—the energy efficiency for capture is not degraded.

Figure 6:
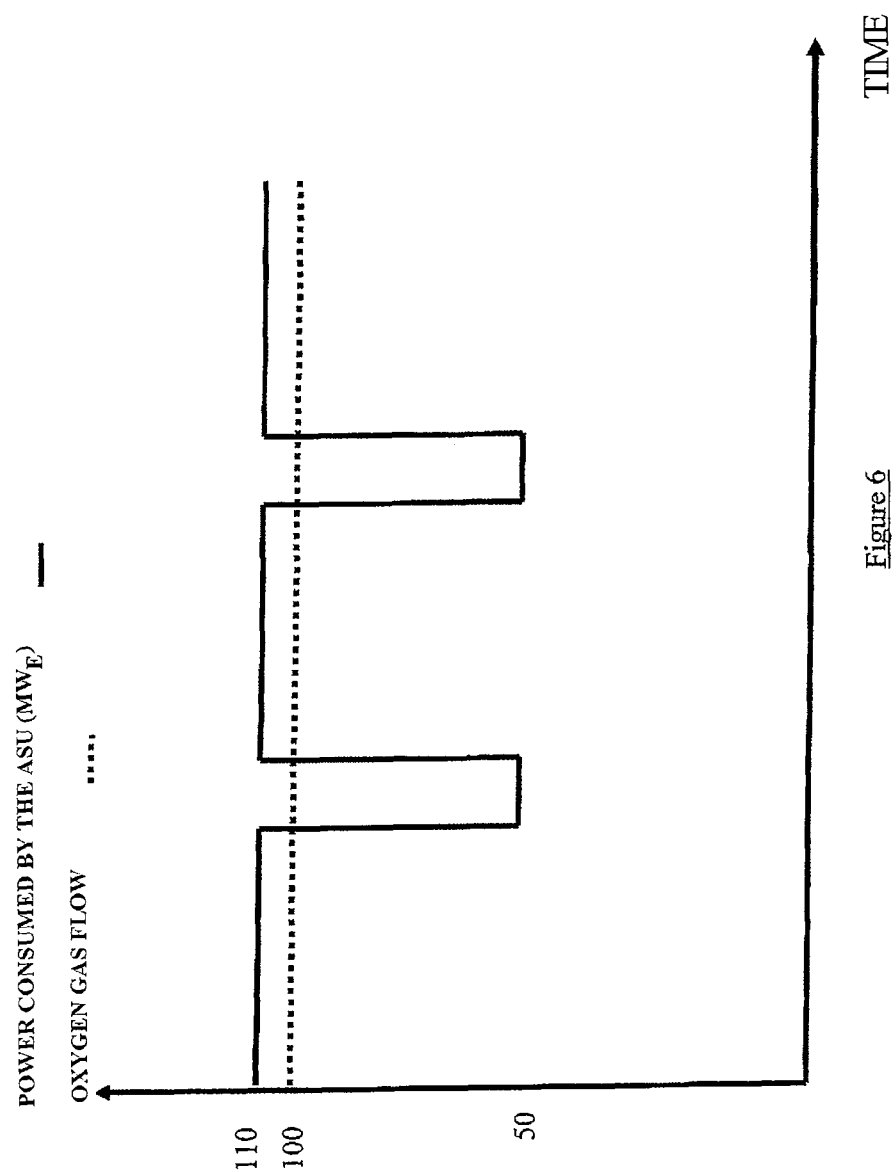
FIG. 6 shows the graphic illustration of power consumed by the ASU in accordance with one embodiment of the present invention.

It is also possible, according to another aspect of the invention, to produce a continuous amount of gaseous oxygen, which is itself then liquefied and stored or sent directly to the boiler, while not drawing constant mechanical power in the air compressors. In this case, the ASU will produce more oxygen than is necessary when the energy is available at a lower cost than its average cost. The excess oxygen relative to that which has to be consumed at this moment is stored in liquid form. When the energy cost significantly exceeds its average cost, it becomes worthwhile to reduce the oxygen production of the ASU and to boil off the oxygen stored previously. It is then possible to have a constant production of gaseous oxygen, while consuming energy only when its cost is advantageous. This type of operation is illustrated in FIG. 6. In order not to be penalized energywise during oxygen boil-off and liquefaction, a cryogenic liquid is formed and stored during oxygen boil-off and is consumed when forming the liquid oxygen reserve.

The two concepts which are namely:
  variable (intermittent) oxygen production with constant drawing power, on the one hand,
  constant oxygen production, with variable drawing power depending on the energy cost, on the other hand,
may be combined within one and the same installation in which partial $CO_2$ capture is provided while not producing more oxygen than is necessary and with an ASU used at its nominal capacity, while still being able to regulate the electric power drawn by the ASU at the moment when said power is the least expensive.

Figure 3:
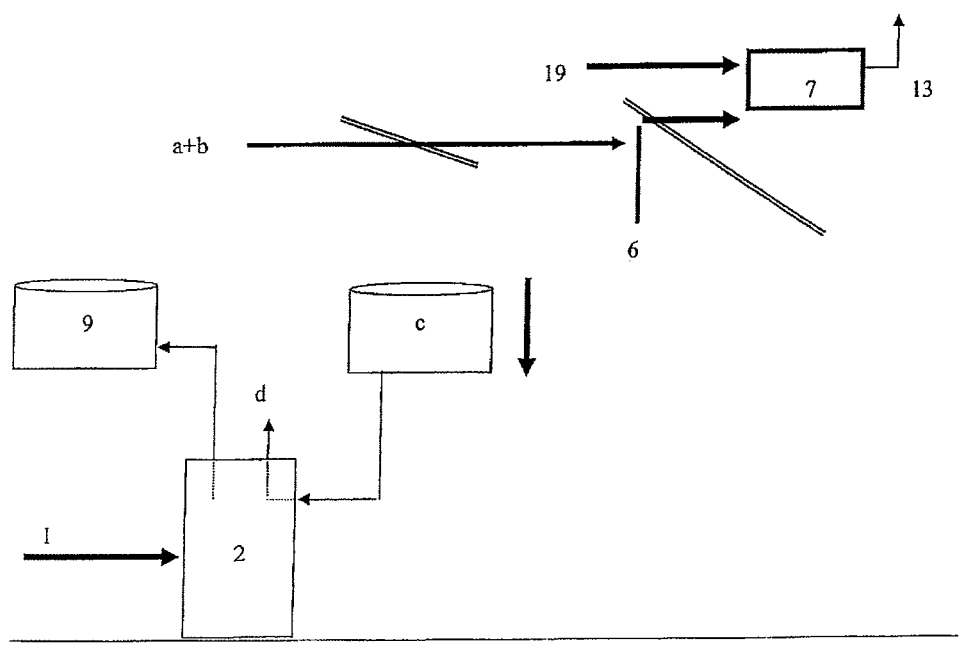
FIG. 3 shows a diagram explaining the operation in "air" mode of the three main units employed in the combustion process according to the invention.

FIG. 3 shows a diagram explaining the operation in "air" mode of the three main units employed in the combustion process according to the invention.

The term "air" mode is understood to mean a mode characterized by combustion in air and the absence of $CO_2$ capture.

In "air" mode, the following are introduced into the ASU 2:
air 1; and
the oxygen-leaner cryogenic liquid c stored during the last phase in "oxyfuel combustion" mode.

The ASU 2 then produces an oxygen-leaner gas d and oxygen 9 in the form of a cryogenic liquid intended to be stored.

The combustion unit 7 then receives the air 19 as single oxidizer, and the combustion flue gas 13 coming from the combustion unit 7 is not sent to the CPU unit. The flue gas 13 is discharged into the atmosphere after being dedusted and desulfurized.

To switch from one mode to the other, for example from "air" mode to "oxyfuel combustion" mode, the $CO_2$ recirculation line is progressively laden with combustion flue gas coming from the combustion unit and with oxygen produced by the air gas separation unit, and the drawn-in air feeding the combustion unit is reduced. When the combustion unit is no longer fed with air, the operation is in "oxyfuel combustion" mode. To return, the operation is carried out in the reverse order, it being quickly understood that nitrogen, introduced by the combustion air, which increases little by little, is found in the flue gas. The ballast $CO_2$ is thus converted to ballast $N_2$ via the air and the recycled nitrogen. The transition from one mode to the other is therefore easy and smooth.

In terms of investment, the ASU is sized on the basis of the amount of oxygen to be produced and therefore also remains proportional to $CO_2$ capture.

The $CO_2$ capture unit itself, i.e. the $CO_2$ compression/purification unit, is sized on the basis of the total flow of $CO_2$ leaving the combustion unit. This is because, for combustion operating with the oxidizer leaner in nitrogen than air, the instantaneous $CO_2$ flow is identical to that for combustion operating in complete capture mode.

The $CO_2$ purification unit itself serves to dry the $CO_2$ coming from the combustion boiler.

When the purification unit is a cryogenic unit, this may be stopped and restarted at will, since it can be kept cold for several hours, even when the unit is not operating. Thus, within the context of the invention, the purification unit is preferably stopped when the boiler is operating with air.

When the purification unit is an absorption unit, this benefits from the fact that the boiler operates alternatively in order to reduce the cost of the adsorption unit.

For thorough drying (down to of the order of one part per million of residual water), the prior art teaches the use of two bottles charged with adsorbent, one drying the gas—the adsorbent contains water—while the other is being regenerated (water is removed) by the passage of a dry gas and/or a gas at lower pressure and/or a hotter gas (for example nitrogen withdrawn from the ASU).

Within the context of the invention, only a single bottle is used, the pressure cycle of which is tied to the boiler operating cycle. Adsorption takes place when the combustion unit is operating with an oxidizer leaner in nitrogen than air and regeneration takes place when the combustion unit is operating with air.

This optimization enables the cost of the equipment to be reduced, given that one bottle less means fewer valves, pipes and adsorbents.

The $CO_2$ produced by the $CO_2$ purification unit will ideally have a purity sufficient for its underground sequestration (for example having a water content of less than 600 ppmv and an oxygen content of less than 1 ppmv).

The process according to the invention furthermore makes it possible:

either to reduce electricity consumption during peak times, for a fixed $O_2$ production;
or to stop oxygen production occasionally, while at the same time not sizing the ASU on the basis of the maximum oxygen flow to be delivered;
or to combine the above two concepts.

The following example explains these various alternatives.

EXAMPLE

An existing power station generating 150 MWe net has to be adapted in order to capture a portion of the $CO_2$ produced. During the first few years of operation, all the $CO_2$ will not be captured, for the want of output or because the price per ton of $CO_2$ emitted does not justify this. Only half of the $CO_2$ is captured, i.e. about 500 000 tons per year compared with the 1 million tons produced. The idea of partial capture using an ASU at constant power is applied. The additional power requirements are:
15 MW for compressing and purifying the $CO_2$ (since the instantaneous flow of $CO_2$ to be treated in oxyfuel combustion mode is the same as if all the $CO_2$ were captured);
12 MW for the ASU—for 100% capture, the ASU would require 24 MW;
the net power to the grid (i.e. the power sold, available for users of the electrical grid) therefore swings between the two values, namely:
123 MWe half of the time with capture and
138 MWe half of the time without capture.

This is because, when there is no $CO_2$ capture, the capture unit is stopped, i.e. 15 MW less power than during $CO_2$ capture. However, the ASU continues to operate at its nominal value in this example.

Capture should therefore take place overnight, corresponding in general to the off-peak hours.

Figure 4:
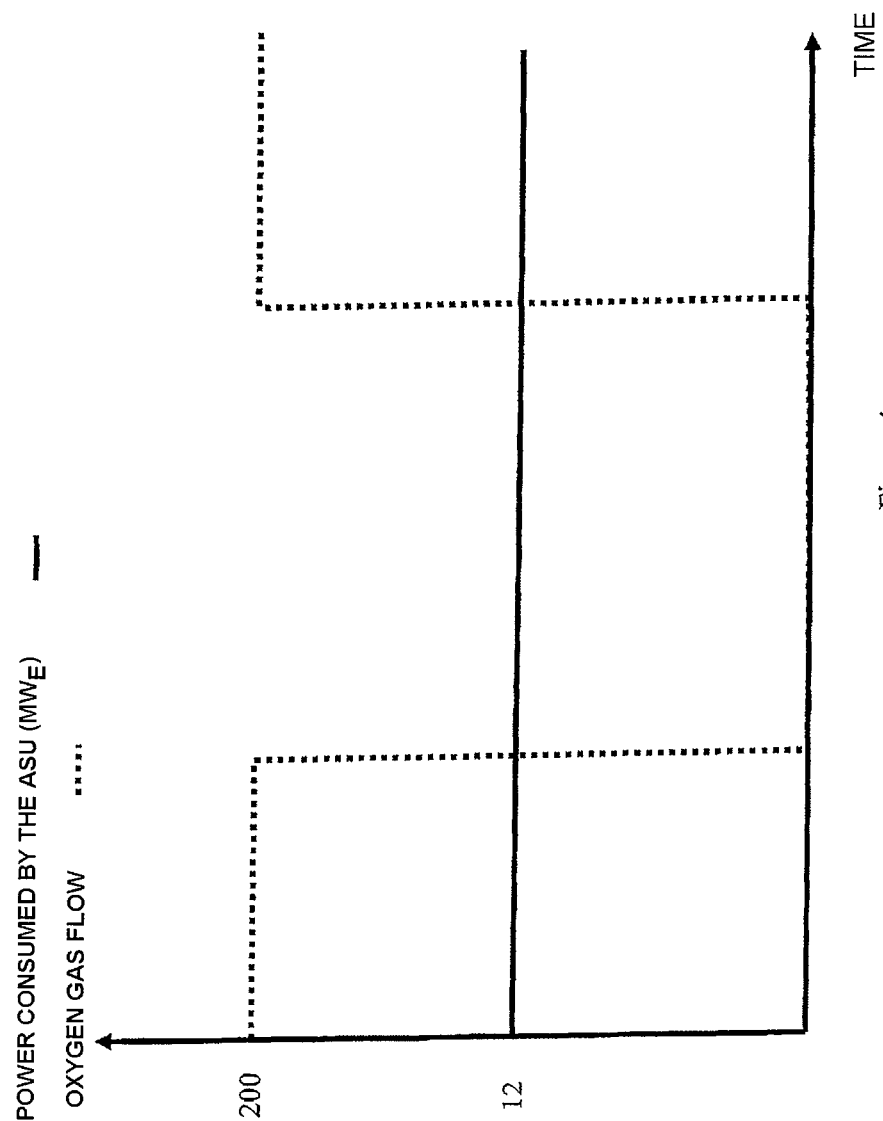
FIG. 4 shows the graphic illustration of power consumed by the ASU in accordance with one embodiment of the present invention.

FIG. 4 shows the operation of the ASU, the power displayed is thus very constant irrespective of the production phase.

An improvement may be made.

This is because, during the peak hours, it is thus possible to further reduce the power drawn by the ASU while slightly increasing it during the rest of the time. The power requirements then become:
15 MW for the $CO_2$ compression/purification (since the instantaneous flow of $CO_2$ to be treated in oxyfuel combustion mode is the same as if all the $CO_2$ were captured);
12.6 MW for the ASU most of the time (in the example, 22 hours out of 24)
6 MW for the ASU when its power is divided by two for the 2 peak hours selected; and
the net power to the grid swings between the following 3 values:
122.4 MWe half of the time with capture,
137.4 MWe half of the time without capture except for the 2 peak hours and
144 MWe during the two daytime peak hours.

Figure 5:
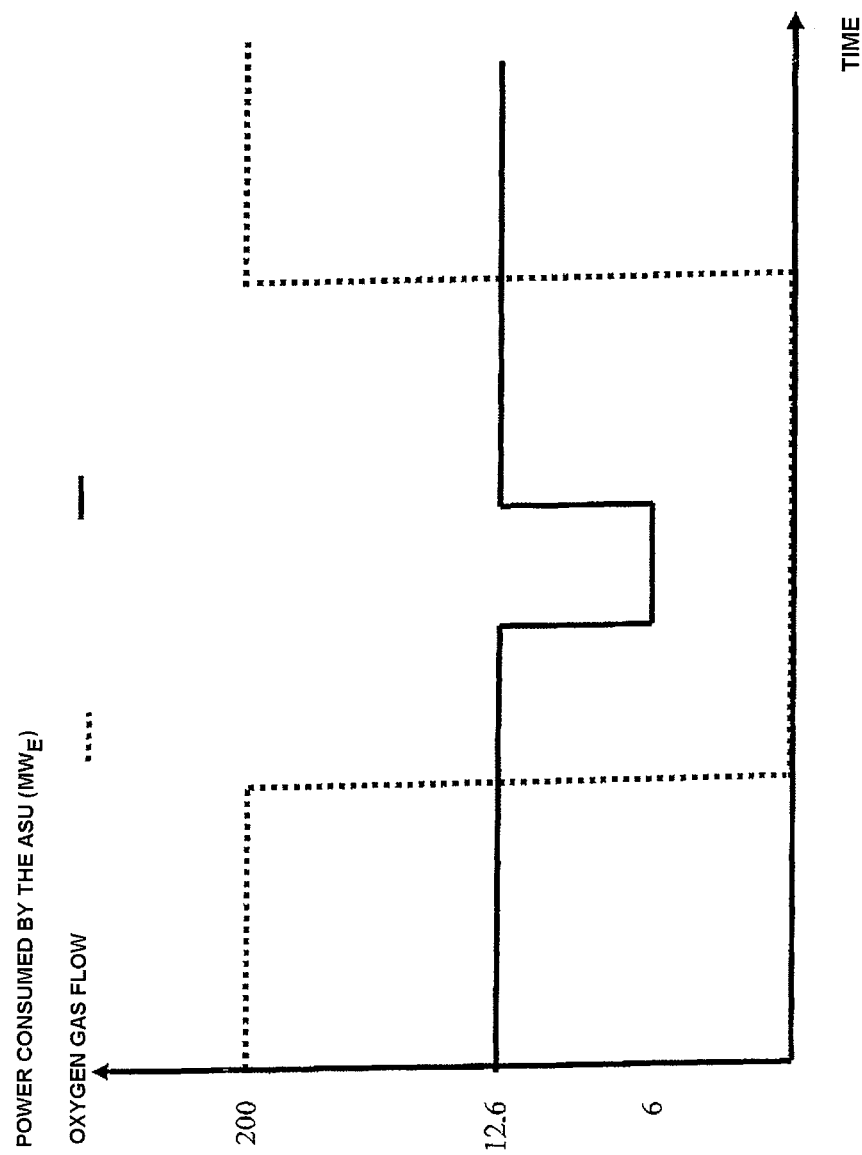
FIG. 5 shows the graphic illustration of power consumed by the ASU in accordance with one embodiment of the present invention.

This operation (just for the ASU) is illustrated in FIG. 5.

What is claimed is:
1. A process for the combustion of carbon fuel comprising;
a) providing an air gas separation unit, wherein over a finite period T; wherein the electrical power required by the air gas production unit is variable;
b) providing a combustion unit configured to operate either with air or with an oxidizer leaner in nitrogen than air, the oxidizer leaner in nitrogen than air at least partly coming from the air gas separation unit, the combustion unit producing flue gas containing $CO_2$;

c) providing a unit for compressing and/or purifying the $CO_2$ in the flue gas, the unit capturing the CO2 from the combustion flue gas, wherein over the finite period T the capture may be is intermittent, wherein the $CO_2$ coming from the $CO_2$ compression and/or purification unit is bottled or it feeds a $CO_2$ line for an industrial usage or an underground storage tank; and d) operating the combustion unit alternately with air and with the oxidizer leaner in nitrogen than air.

2. The process of claim 1, wherein during period T, the power drawn by the air gas production unit is variable, and the CO2 capture is not intermittent.

3. The process of claim 1, wherein during period T, the power drawn by the air gas production unit is not variable, and the CO2 capture is intermittent.

4. The process of claim 1, wherein during period T, the power drawn by the air gas production unit is variable, and the CO2 capture is intermittent.

5. The process of claim 1, wherein the flow of oxygen produced by the air gas separation unit is variable.

6. A process for the combustion of carbon fuel comprising:
a) providing an air gas separation unit, wherein over a finite period T; wherein the electrical power required by the air gas production unit is variable;
b) providing a combustion unit configured to operate either with air or with an oxidizer leaner in nitrogen than air, the oxidizer leaner in nitrogen than air at least partly coming from the air gas separation unit, the combustion unit producing flue gas containing $CO_2$;
c) providing a unit for compressing and/or purifying the $CO_2$ in the flue gas, the unit capturing the $CO_2$ from the combustion flue gas, wherein over the finite period T the capture may be is intermittent;
d) operating the combustion unit alternately with air and with the oxidizer leaner in nitrogen than air, wherein the combustion unit has a carbon fuel consumption and said combustion unit &livers power, wherein the carbon fuel consumption by the combustion unit is constant over the period. T, wherein the power delivered by said combustion process is variable over the period T.

7. The process of claim 1, wherein the $CO_2$ compression and/or purification unit has, over the period T, at least one stop phase and at least one operating phase.

8. The process of claim 1, wherein the air gas separation unit. draws power, wherein said power may vary over at least one portion of the period T, but the air gas separation unit produces a constant oxygen flow during this same portion of the period T.

9. The process of claim 1, wherein the air gas separation unit has an oxygen production phase, and wherein the air gas separation unit switches to the oxygen production phase when an oxidizer leaner in nitrogen than air is employed in the combustion unit.

10. The process of claim 1, wherein the oxygen coming from the air gas separation unit is entirely or partly stored in the form of a cryogenic liquid.

11. The process of claim 10, wherein the stored oxygen serves as a reserve for a device external to the combustion process units.

12. The process of claim 1, wherein said air gas production unit produces a cryogenic liquid less rich in oxygen when producing oxygen, wherein at least one portion of the cryogenic liquid less rich in oxygen is stored on leaving the air gas separation unit when the oxygen is consumed in the combustion unit.

13. The process of claim 12, wherein the cryogenic liquid less rich in oxygen stored on leaving the air gas separation unit is consumed within the air gas separation unit when oxygen is liquefied by this same air gas separation unit.

14. The process of claim 1, wherein at least one portion of the combustion flue gas is mixed with the oxygen produced by the air gas production unit before being introduced into the combustion unit when the combustion unit is operating with the oxidizer leaner in nitrogen than air.

15. The process of claim 1, wherein the air gas separation unit has, over the period T, at least one stop phase or reduced-output phase and at least one operating phase with a higher output than the reduced output, and in that the time required for switching from a stop phase or reduced-output phase to an operating phase with a higher output is less than one hour.

16. The process of claim 15, wherein the time required for switching from a stop phase or reduced-output phase to an operating phase with a higher output is less than 30 minutes.

17. The process of claim 15, wherein the time required for switching from a stop phase or reduced-output phase to an operating phase with a higher output is less than 15 minutes.

18. The process of claim 15, wherein the time required to switch from a stop phase or reduced-output phase to an operating phase with a higher output is shortened by cryogenic liquid being injected into and/or withdrawn from the air gas separation unit.

19. The process of claim 10, wherein the oxygen produced by the air gas separation unit is at least partly stored When the energy necessary for oxygen production is available at a lower cost than the average.

20. The process of claim 19, wherein the stored oxygen is consumed by the air gas separation unit when the energy necessary for oxygen production is available at a higher cost than the average.

21. The process of claim 1, wherein the $CO_2$ coming from the $CO_2$ compression and/or purification unit is at least partly stored so as to smooth out the amount of $CO_2$ produced.

22. The process of claim 1, wherein the $CO_2$ compression and/or purification phases coincide with phases in which the energy necessary for this $CO_2$ compression and/or purification is available at a lower cost than the average.

23. The process of claim 1, wherein the air gas production unit, the combustion unit and the $CO_2$ compression and/or purification unit are automatically controlled so as to adapt to the variation in energy costs necessary for operating these units.

24. The process of claim 1, wherein the $CO_2$ compression and/or purification unit employs a compressor and/or a drying unit.

25. The process of claim 24, wherein the drying unit is a cryogenic unit.

26. The process of claim 24, wherein the drying unit consists of a single bottle filled with adsorbents according to a pressure cycle comprising an adsorption phase coinciding with the operation of the combustion unit with an oxidizer leaner in nitrogen than air and a regeneration phase coinciding with the operation of the combustion unit with air.

27. A carbon fuel combustion installation comprising;
a) an air gas production unit;
b) a combustion unit configured to operate in at least two modes of operation, wherein in a first mode of operation, the combustion unit is configured to operate air and in a second mode of operation, the combustion unit is configured to operate with an oxidizer leaner in nitrogen than air, coming from the air gas separation unit; an oxidizer leaner in nitrogen than air, coming from the air gas separation unit;

c) a unit for compressing and/or purifying the $CO_2$ coming from the combustion flue gas, wherein the operation of these three units is controlled by a computer so that, over a finite period T;
d) the electrical power required by the air gas production unit is variable; and/or
e) the capture of the $CO_2$ coming from the combustion flue gas, via the $CO_2$ compression and/or purification unit, is intermittent, wherein the air gas production unit, the combustion unit and the $CO_2$ compression and/or purification unit are automatically controlled so as to adapt to the variation in energy costs necessary for operating these units.

28. The installation of claim 27, wherein a $CO_2$ recirculation line connects the outlet of the combustion unit to the inlet of the combustion unit.

* * * * *